(12) United States Patent
Suh

(10) Patent No.: US 8,499,455 B2
(45) Date of Patent: Aug. 6, 2013

(54) METHOD OF ESTABLISHING WIND POWER GENERATOR USING THE LEADING RAIL

(76) Inventor: Dong Taek Suh, Yongin (KR)

( * ) Notice: Subject to any disclaimer, the term of this patent is extended or adjusted under 35 U.S.C. 154(b) by 807 days.

(21) Appl. No.: 12/522,917

(22) PCT Filed: Jan. 9, 2008

(86) PCT No.: PCT/KR2008/000117
§ 371 (c)(1),
(2), (4) Date: Mar. 22, 2010

(87) PCT Pub. No.: WO2008/084970
PCT Pub. Date: Jul. 17, 2008

(65) Prior Publication Data
US 2010/0199487 A1    Aug. 12, 2010

(30) Foreign Application Priority Data
Jan. 11, 2007 (KR) .................. 10-2007-0003453
Aug. 30, 2007 (KR) .................. 10-2007-0087402

(51) Int. Cl.
B21D 47/00 (2006.01)
(52) U.S. Cl.
USPC ......... 29/897; 29/592; 52/745.04; 52/745.17; 52/741.1; 52/651.01; 52/651.07; 212/314; 212/324; 212/228; 212/227
(58) Field of Classification Search
USPC .................. 29/897, 592; 52/745.04, 745.17, 52/741, 1, 651, 651.07; 212/314, 324, 228, 212/227
See application file for complete search history.

(56) References Cited

U.S. PATENT DOCUMENTS

| | | | | |
|---|---|---|---|---|
| 4,028,792 A * | 6/1977 | Tax et al. | ........................ | 29/431 |
| 5,794,387 A * | 8/1998 | Crookham | ................... | 52/122.1 |
| 6,614,125 B2 * | 9/2003 | Willis et al. | ..................... | 290/55 |
| 6,868,646 B1 * | 3/2005 | Perina | ........................ | 52/745.17 |
| 7,765,766 B2 * | 8/2010 | Gomez et al. | .............. | 52/745.04 |
| 7,877,934 B2 * | 2/2011 | Livingston et al. | ............... | 52/40 |
| 8,011,098 B2 * | 9/2011 | Vorhies et al. | ............... | 29/889.2 |
| 2006/0120809 A1 * | 6/2006 | Ingram et al. | ............. | 405/195.1 |

FOREIGN PATENT DOCUMENTS

| | | |
|---|---|---|
| JP | 2002-242483 | 8/2002 |
| JP | 2004-036407 | 2/2004 |
| WO | 2006/003207 | 1/2006 |
| WO | 2006/013222 | 2/2006 |

* cited by examiner

Primary Examiner — Livius R Cazan
Assistant Examiner — Azm Parvez
(74) Attorney, Agent, or Firm — Christopher Paul Mitchell

(57) ABSTRACT

The present invention relates to a method for installing a land wind power generator by using lead rails, and the method includes the steps of: locating a lower support having an insertion protrusion, a horizontal stepped surface, and a ground anchor, under the ground; locating a pair of posts of a tower crane and a cage for each post at the horizontal stepped surface of the lower support, ascending a nacelle assembly and an overhead crane, and locating an intermediate support by means of an outside crane; and locating the lead rails along the ground and the front surface of the intermediate support and ascending an upper support along the lead rails by means of the overhead crane. Next, after a nacelle base, a support frame, the lead rails, and the tower crane are disassembled from the located positions, a plurality of propellers connected to rollers located inside a rotary part of the nacelle assembly are lifted by means of a winch and are inserted into a plurality of coupling grooves of the rotary part. The method of this invention has relatively low installation costs and provides more effective and rapid installation processes to advantageously reduce the construction period.

5 Claims, 6 Drawing Sheets

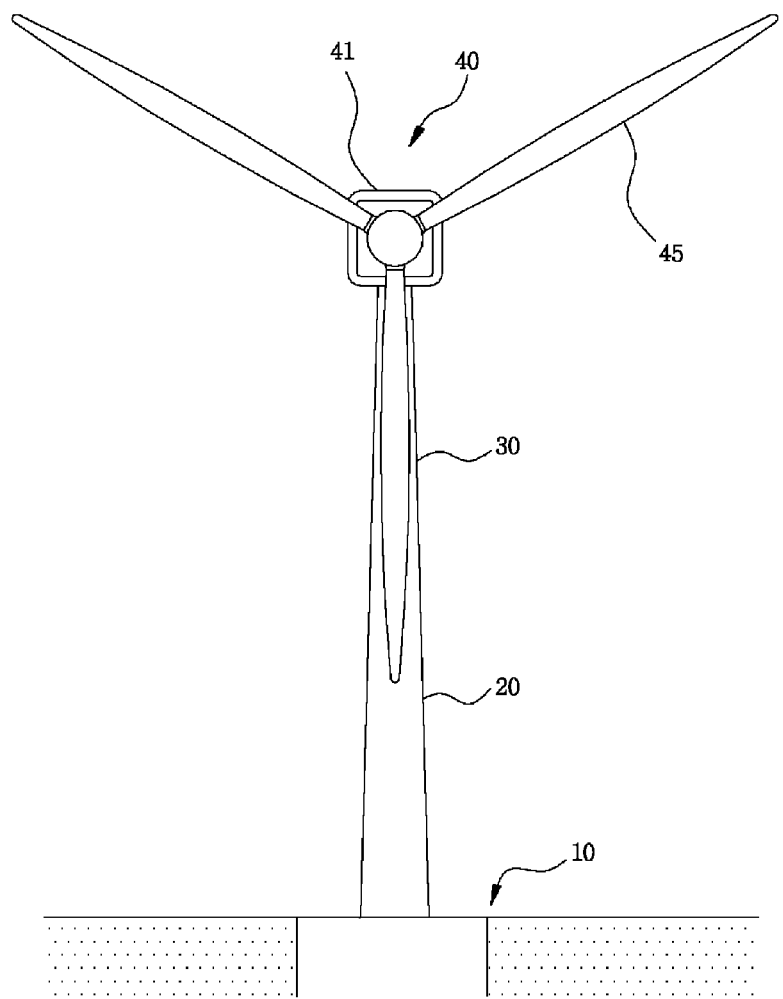

METHOD OF ESTABLISHING WIND POWER GENERATOR USING THE LEADING RAIL

Related Applications

This application is a 371 application of International Application No. PCT/KR2008/000117, filed Jan. 9, 2008, which in turn claims priority from Korean Patent Application Nos. 10-2007-0003453, filed Jan. 11, 2007, and 10-2007-0087402, filed Aug. 30, 2007, all of which are incorporated herein by reference.

TECHNICAL FIELD

The present invention relates to a method for installing a land wind power generator, and more particularly, to a method for installing a land wind power generator that is capable of installing an upper support to the top end of an intermediate support located at a substantially high position where an aerial lifting crane does not work, by using the lead rails and an overhead crane in rapid, accurate, and safe manners, and installing the lead rails along the ground and the front surface of the intermediate support, such that the upper support is located rapidly and accurately at the top end of a lower support under the guide of the lead rails by means of the overhead crane disposed at a nacelle assembly.

BACKGROUND ART

As fossil fuel costs have been increased to cause environmental destruction due to the harmful gas generated from the fossil fuel, and further, as dangers related to nuclear power energy are on the rise, wind power is considered as a pollution-free energy source in a natural state that is most economical in the alternative energy sources developed currently. According to a wind power technology, the electric power that is generated by converting a wind force into a rotary force is directly supplied to power systems or demanders. If the wind power is actively adopted, areas such as a mountain area, a coast and back area, a sea wall and the like can be developed to enhance national territorial utilization efficiencies.

With such advantages, the wind power is considered to be a most powerful alternative energy source, and the wind power systems having a capacity of about 32,154 MW(which is calculated at the end of 2002) have been already installed over the world. The capacity of the wind power systems installed for only 2002 is 7,227 MW, which is higher than that of the nuclear power generators installed in the same year.

Lots of interests in developing the wind power systems are greatly increasing in Korea so as to cope with realistic problems that the international environments are changed, oil prices are raised, and about 96% of the domestic energy is imported.

In addition, recently, the introduction of the wind power system has been enormously increased since the wind power system has some advantages in that it is simple in structure or installation, it is easy to manage, and it is possible to operate in unmanned and automatic manners.

In addition, recently, the introduction of the wind power system has been enormously increased since the wind power system has some advantages in that it is simple in structure or installation, it is easy to manage, and it is possible to operate in unmanned and automatic manners.

Even though the conventional wind power generators have such the advantages, however, they have had some serious disadvantages in that since the upper support is located to a substantially high position, the aerial lifting crane should be needed, and when the aerial lifting crane is really adopted, it causes the limitation of the work, the difficulties in the work, and the dangers of the work.

DISCLOSURE OF INVENTION

Technical Problem

Accordingly, the present invention has been made to solve these problems, and it is an object of the present invention to provide a method for installing a land wind power generator by using lead rails such that an upper support or an intermediate support for the land wind power generator is installed by using the lead rails and an overhead crane, thereby having relatively low installation costs and more effective installation processes when compared with conventional installing methods.

Technical Solution

To achieve the above object, there is provided a method for installing a land wind power generator by using lead rails, the method including the steps of: locating a lower support having an insertion protrusion, a horizontal stepped surface, and a ground anchor, under the ground; locating a pair of posts of a tower crane and a cage for each post at the horizontal stepped surface of the lower support, ascending a nacelle assembly and an overhead crane, and locating an intermediate support by means of an outside crane; and locating the lead rails along the ground and the front surface of the intermediate support and ascending an upper support along the lead rails by means of the overhead crane. Next, after a nacelle base, a support frame, the lead rails, and the tower crane are disassembled from the located positions, a plurality of propellers connected to rollers located inside a rotary part of the nacelle assembly are lifted by means of a winch and are inserted into a plurality of coupling grooves of the rotary part.

ADVANTAGEOUS EFFECTS

According to the present invention, there is provided a method for installing a land wind power generator by using lead rails that is capable of locating the upper support by using the overhead crane and the lead rails, thereby having relatively low installation costs when compared with conventional installing methods and providing more effective and rapid installation processes to advantageously reduce the construction period.

BRIEF DESCRIPTION OF THE DRAWINGS

FIG. 6 is a front view showing the appearance of the land wind power generator after the assembling has been finished.

BEST MODE FOR CARRYING OUT THE INVENTION

Figure 3:
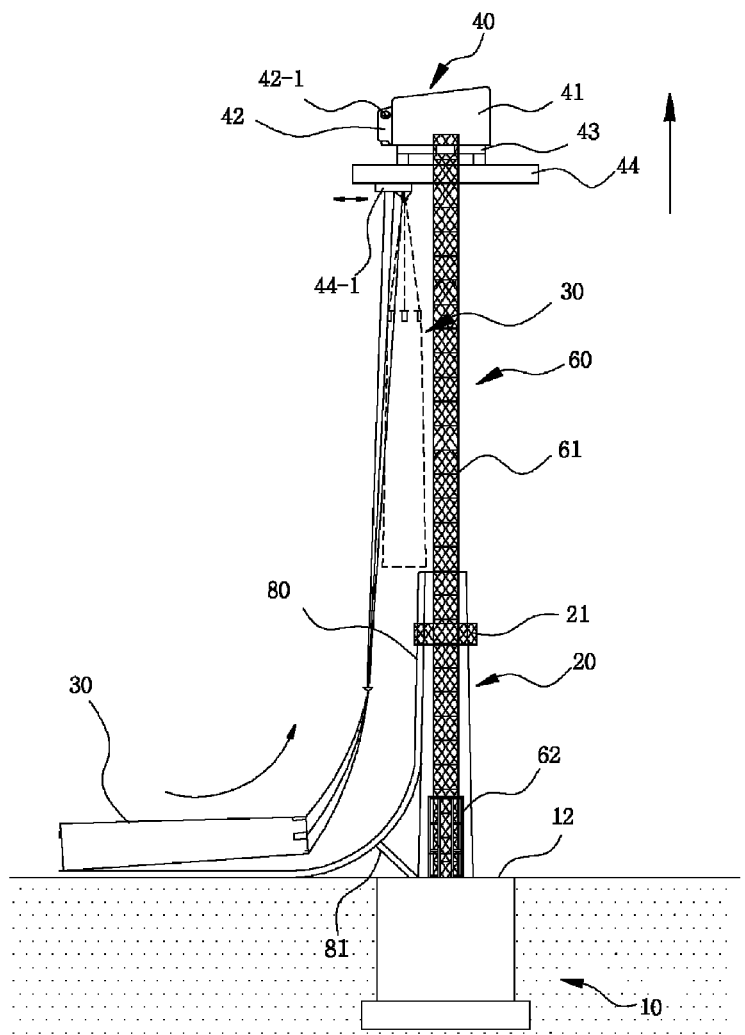
FIG. 3 is a side view showing a process for ascending the nacelle assembly and locating an upper support by using the lead rails and an overhead crane.
Figure 4:
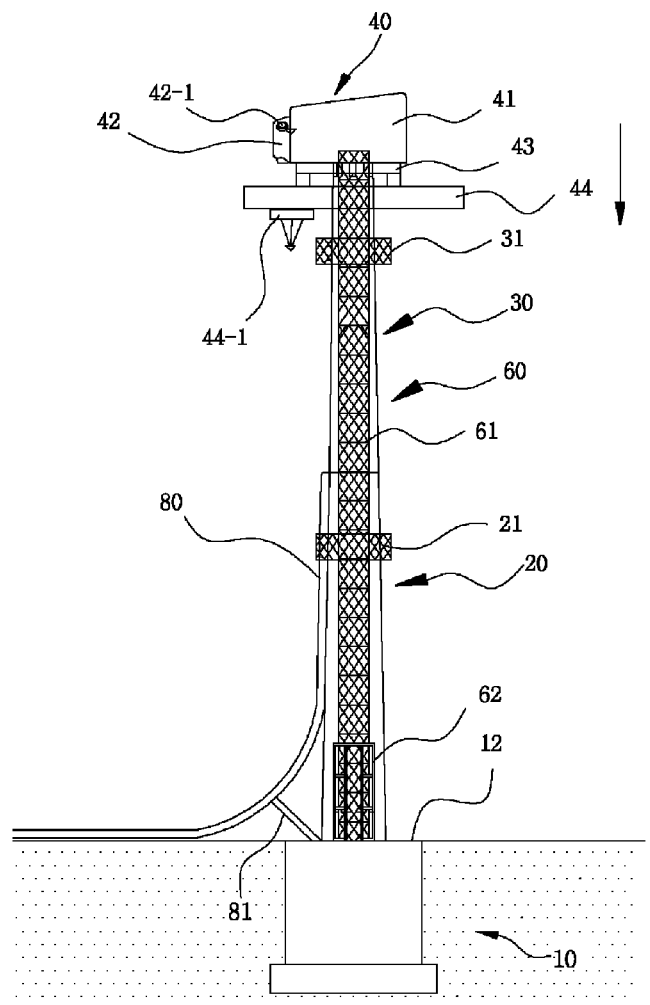
FIG. 4 is a side view showing an assembled state wherein the nacelle assembly of FIG. 3 is descended and assembled with the upper support.
Figure 5:
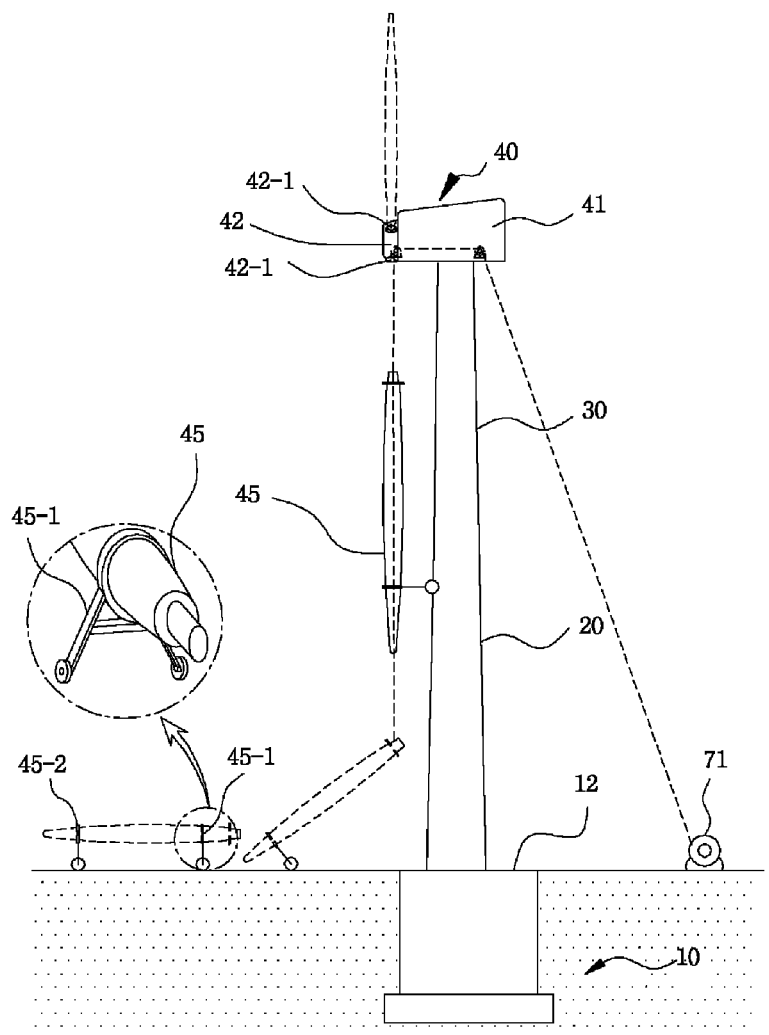
FIG. 5 is a side view showing a process for lifting and assembling propellers with a rotary part.

Hereinafter, an explanation on a method for installing a land wind power generator by using lead rails according to the present invention will be given with reference to the attached drawings. First, FIG. 1 is a front view showing an assembling process of a lower support in a method for installing a land wind power generator by using lead rails according to the present invention, FIG. 2 is a front view showing a process for installing a nacelle assembly and an intermediate support in the method for installing a land wind power generator by using lead rails according to the present invention, FIG. 3 is a side view showing a process for ascending the nacelle assembly and locating an upper support by using the lead rails and an overhead crane, FIG. 4 is a side view showing an assembled state wherein the nacelle assembly of FIG. 3 is descended and assembled with the upper support, FIG. 5 is a side view showing a process for lifting and assembling propellers with a rotary part, and FIG. 6 is a front view showing the appearance of the land wind power generator after the assembling has been finished.

According to the present invention, there is provided a method for installing a land wind power generator by using lead rails, the method including: a step (S10) of on the ground a lower support 10 having an insertion protrusion 11 formed at the top end thereof and a horizontal stepped surface 12 extended horizontally from the lower portion of the insertion protrusion 11; a step (S20) of a pair of posts 61 of a tower crane 60 and a cage 62 for each post at the both sides of the horizontal stepped surface 12 of the lower support 10, and ascending a nacelle assembly 40 having a support frame 44 having an overhead crane 44-1, a nacelle base 43 connected to the pair of posts 61 of the tower crane 60, and a nacelle 41 disposed at the top portion thereof; a step (S30) of fixedly coupling an intermediate support 20 connected to an outside crane 70 to the insertion protrusion 11 of the lower support 10, and locating a pair of horizontal support stands 21 connected to the posts 61 at the both sides of the intermediate support 20; a step (S40) of locating the lead rails 80 along the ground and the front surface of the intermediate support 20, ascending the nacelle assembly 40, ascending an upper support 30 connected to the overhead crane 44-1 along the lead rails 80 in such a manner as to be coupled to the top end of the intermediate support 20, and locating a pair of horizontal support stands 31 connected to the posts 61 at the both sides of the upper support 30; a step (S50) of descending the nacelle assembly 40 so as to insert the upper support 30 into a support groove formed at the bottom portion of the center of the nacelle 41 and locating the nacelle 41 at the upper support 30; a step (S60) of separating the nacelle 41 and the nacelle base 43 from each other, descending the nacelle base 43 and the support frame 44, and disassembling the horizontal support stands 21 and 31, the lead rails 80, the nacelle base 43, the support frame 44, and the posts 61; and a step (S70) of locating a roller inside a rotary part 42 of the nacelle 41, lifting a plurality of propellers 45 connected to a lifting line by means of a winch 71, and inserting the propellers 45 into a plurality of coupling grooves 42-1 formed on the rotary part 42.

Figure 1:
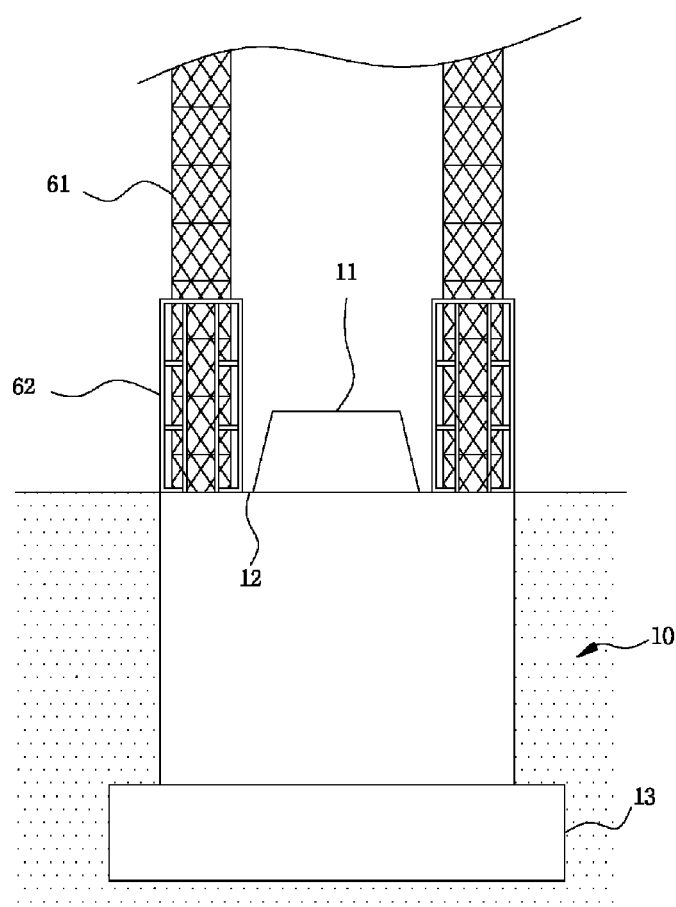
FIG. 1 is a front view showing an assembling process of a lower support in a method for installing a land wind power generator by using lead rails according to the present invention.

As shown in FIG. 1, first, the lower support 10 has the insertion protrusion 11 formed at the top end thereof so as to insertedly couple the lower end periphery of the intermediate support 20 thereto, the horizontal stepped surface 12 extended horizontally from the lower portion of the insertion protrusion 11 so as to allow the pair of posts 61 of the tower crane 60 and the cages 62 for the posts 61 to be stably supported thereat, and a ground anchor 13 disposed around the bottom end periphery thereof so as to firmly fix the lower support 10 thereto. As the horizontal stepped surface 12 is very important, the lower support 10 should be large-sized having a large diameter, and at this time, if the lower support 10 has a space formed in the internal middle portion thereof, the whole weight can be reduced.

Figure 2:
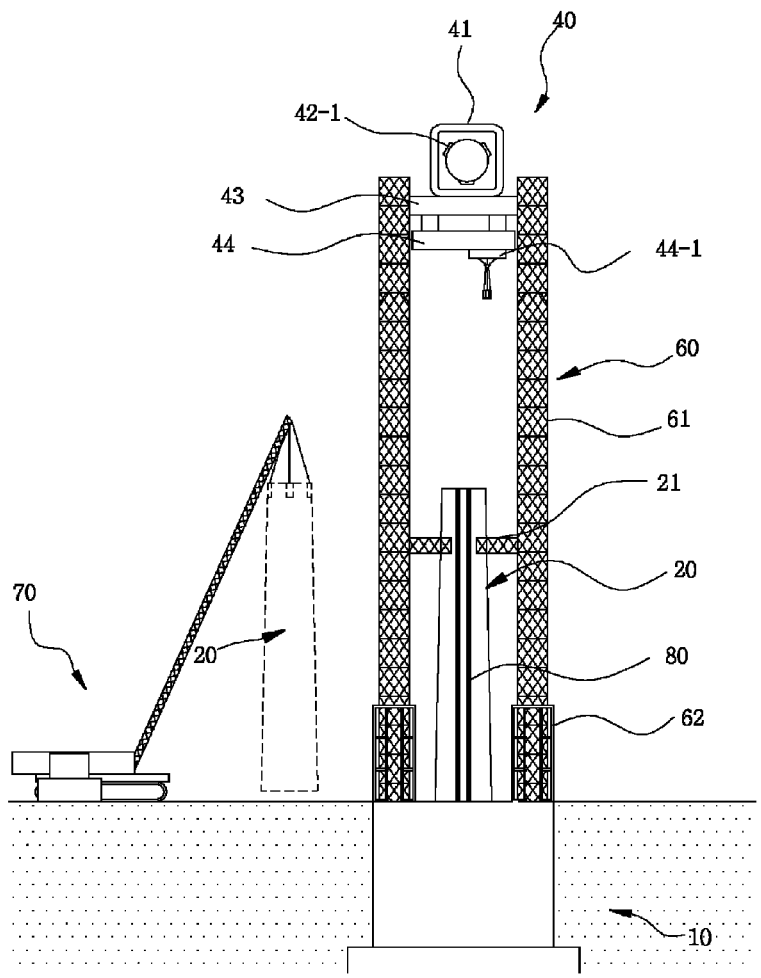
FIG. 2 is a front view showing a process for installing a nacelle assembly and an intermediate support in the method for installing a land wind power generator by using lead rails according to the present invention.

FIG. 2 is a front view showing a process for installing the intermediate support 20, the nacelle assembly 40, and the tower crane 60 in the method for installing a land wind power generator by using lead rails according to the present invention, and as shown, the tower crane 60 having the posts 61 and the cage 62 for each post is located at the both sides of the horizontal stepped surface 12 of the lower support 10. Then, the nacelle assembly 40 is ascended by means of general jack-up, and the intermediate support 20 is insertedly fixed to the insertion protrusion 11 of the lower support 10 by means of the outside crane 70 connected to the intermediate support 20. Next, the intermediate support 20 is supported at the top portion thereof by the horizontal support stands 21 disposed at the both sides thereof.

Then, the lead rails 80 are mounted along the ground and the front surface of the intermediate support 20. The nacelle assembly 40 includes the supporting frame 44, the nacelle base 43, the rotary part 42, and the nacelle 41. The supporting frame 44 that is located at the lowermost portion of the nacelle assembly 40 has the overhead crane 44-1 having high power mounted thereon, and the nacelle base 43 located above the supporting frame 44 is connected at the both sides thereof to the posts 61 of the tower crane 60, thereby supporting the nacelle 41 located on the top surface thereof as well as the supporting frame 44 and the overhead crane 44-1. Moreover, the rotary part 42 is located at the center portion of the front surface of the nacelle 41 and has three coupling grooves 42-1 for inserting the propellers 45 thereinto. The nacelle 41 and the rotary part 42 have a space formed at the inside thereof so as to mount rollers (not shown) for lifting the propellers 45 therein.

FIG. 3 is a side view showing a process for locating the upper support 30 by using the lead rails 80 and the high power of overhead crane 44-1. As shown, after the intermediate support 20 is located, the nacelle assembly 40 is ascended by means of general jack-up, and the upper support 30 is ascended vertically along to the position to be located along the lead rails 80 mounted along the ground and the front surface of the intermediate support 20. Thus, if the upper support 30 reaches the position to be located, the overhead crane 44-1 is moved backwardly to fix the upper support 30 at the top portion of the intermediate support 20, and next, the upper support 30 is fixed by means of the horizontal support stands 31 formed at the both sides thereof. Each of the lead rails 80 has a rail support bar 81 formed between the lower end of the intermediate support 20 and the lower support 10 such that the lead rails 80 are reinforced. Further, if a support for extending the upper support 30 is needed, the tower crane 60 and the lead rails 80 can be extended longer, and if the upper support 30 or the extension support on the ground is moved, the outside crane or the winch can be adopted along the lead rails 80.

FIG. 4 is a side view showing an assembled state wherein the nacelle assembly 40 of FIG. 3 is descended and assembled with the upper support 30, wherein if the lower support 10, the intermediate support 20, and the upper support 30 are completely located, the nacelle assembly 40 connected to the tower crane 60 is descended by means of general jack-up to allow the top end of the upper support 30 to be inserted into a support groove (not shown) formed on the central lower portion thereof, which enables the nacelle 41 to be fixed, thereby finishing the formation of the wind power generator body excepting the propellers 45. If the upper support 30 and the nacelle 41 are coupled to each other to form the wind power generator body, the nacelle 41 and the nacelle base 43 are separated from each other, and thus, the nacelle base 43 and the support frame 44 are descended. The horizontal support stands 21 and 31, the lead rails 80, the nacelle base 43, the support frame 44, and the tower crane 60 are disassembled. So as to firmly support the intermediate support 20 and the upper support 30, the horizontal support stands 21 and 31 are adapted to compress and support the intermediate support 20 and the upper support 30 mechanically, hydraulically, or in an electrically driven manner.

FIG. 5 is a side view showing a process for lifting and assembling the propellers 45 with the rotary part 42, and as shown, the rollers (not shown) mounted inside the nacelle 41 and the rotary part 42 are mounted to lift the propellers 45 connected to the lifting line by means of the winch 71 mounted on the ground, thereby allowing the propellers 45 to be inserted into the plurality of coupling grooves 42-1. In this case, as the rotary part 42 is rotated to move the coupling grooves 42-1 downwardly, the respective propellers 45 are insertedly coupled to the coupling grooves 42-1. Each of the propellers 45 is supported by means of the front support roller stand 45-1 detachably mounted on the ground and a rear support roller stand 45-2, such that when the propellers 45 are lifted to the coupling grooves 42-1, the front support roller stand 45-1 is removed from each of the propellers 45. Thus, the propellers 45 are supported by only the rear support roller stand 45-2 and lifted to the coupling grooves 42-1. After the propellers 45 are inserted into the plurality of coupling grooves 42-1, the rear support roller stand 45-2 is removed from each of the propellers 45.

FIG. 6 is a front view showing the appearance of the land wind power generator after the assembling has been finished, wherein if the propellers 45 are all mounted, all of the processes for installing the land wind power generator by using the lead rails according to the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Industrial Applicability

As described above, according to the present invention, there is provided a method for installing a land wind power generator by using lead rails that is capable of locating the upper support by using the overhead crane and the lead rails, thereby having relatively low installation costs when compared with conventional installing methods and providing more effective and rapid installation processes to advantageously reduce the construction period.

The invention claimed is:

1. A method for installing a land wind power generator by using lead rails, the method comprising:

a step (S10) of providing on the ground a lower support 10 having an insertion protrusion 11 formed at the top end thereof and a horizontal stepped surface 12 extended horizontally from the lower portion of the insertion protrusion 11;

a step (S20) of providing a pair of posts 61 of a tower crane 60 and a cage 62 for each post at the both sides of the horizontal stepped surface 12 of the lower support 10, and ascending a nacelle assembly 40 having a support frame 44 having an overhead crane 44-1, a nacelle base 43 connected to the pair of posts 61 of the tower crane 60, and a nacelle 41 disposed at the top portion thereof;

a step (S30) of fixedly coupling an intermediate support 20 connected to an outside crane 70 to the insertion protrusion 11 of the lower support 10, and locating a pair of horizontal support stands 21 connected to the posts 61 at the both sides of the intermediate support 20;

a step (S40) of locating the lead rails 80 along the ground and the front surface of the intermediate support 20, ascending the nacelle assembly 40, ascending an upper support 30 connected to the overhead crane 44-1 along the lead rails 80 in such a manner as to be coupled to the top end of the intermediate support 20, and locating a pair of horizontal support stands 31 connected to the posts 61 at the both sides of the upper support 30;

a step (S50) of descending the nacelle assembly 40 so as to insert the upper support 30 into a support groove formed at the bottom portion of the center of the nacelle 41 and locating the nacelle 41 at the upper support 30;

a step (S60) of separating the nacelle 41 and the nacelle base 43 from each other, descending the nacelle base 43 and the support frame 44, and disassembling the horizontal support stands (21 and 31), the lead rails 80, the nacelle base 43, the support frame 44, and the posts 61; and a step (S70) of locating a roller inside a rotary part 42 of the nacelle 41, lifting a plurality of propellers 45 connected to a lifting line by means of a winch 71, and inserting the propellers 45 into a plurality of coupling grooves 42-1 formed on the rotary part 42.

2. The method as defined in claim 1, wherein the lower support 10 has a ground anchor 13 disposed around the bottom end periphery thereof.

3. The method as defined in claim 1, wherein the horizontal support stands (21 and 31) are adapted to compress and support the intermediate support 20 and the upper support 30 mechanically, hydraulically, or in an electrically driven manner.

4. The method as defined in claim 1, wherein each of the propellers 45 is supported by means of a front support roller stand 45-1 and a rear support roller stand 45-2 on the ground, and when the propellers 45 are lifted to the coupling grooves 42-1, the front support roller stand 45-1 is removed from each of the propellers 45 such that each propeller 45 is supported and lifted by the rear support roller stand 45-2.

5. The method as defined in claim 1, wherein each of the lead rails 80 has a rail support bar 81 formed between the lower end of the intermediate support 20 and the lower support 10 so as to reinforce the mounted lead rails 80.

* * * * *